No. 864,773. PATENTED SEPT. 3, 1907.
J. A. DIMOCK.
CAMERA FOCUSING DEVICE.
APPLICATION FILED AUG. 1, 1906.
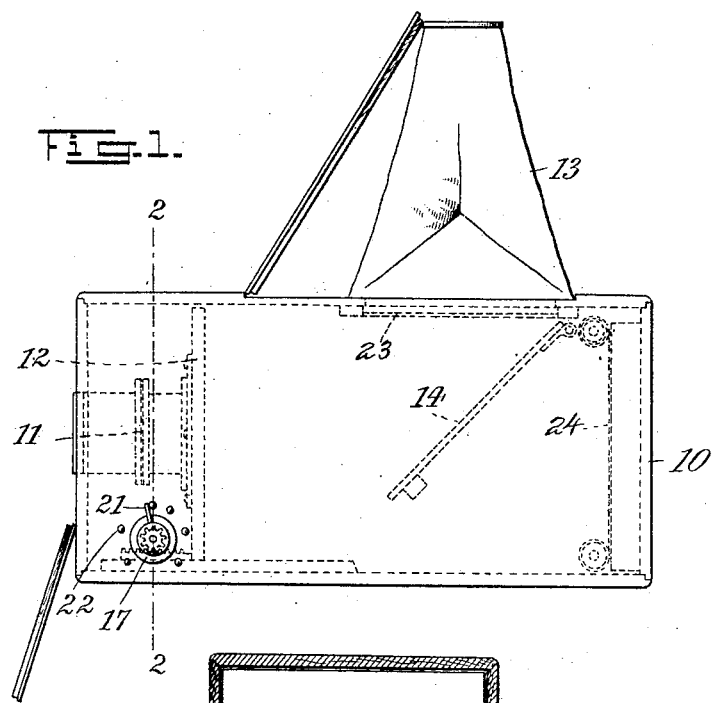
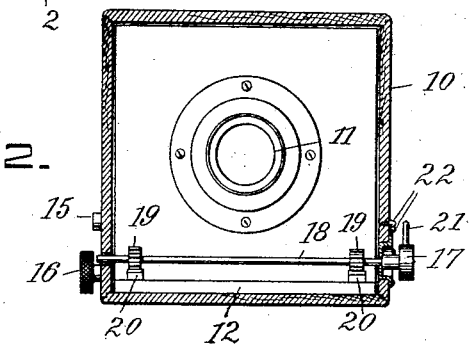
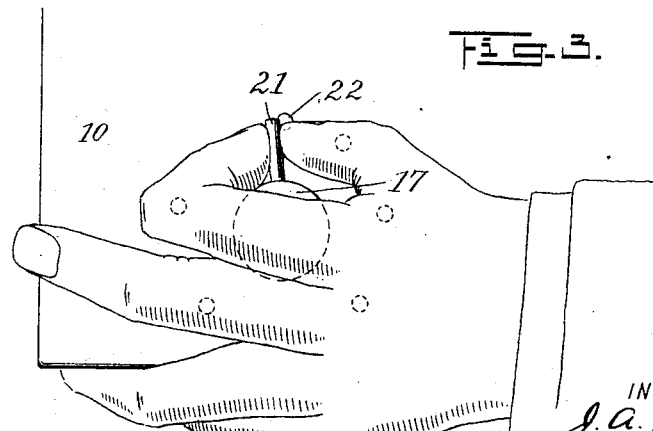
WITNESSES
L. T. Shaw
J. Blake
INVENTOR
J. A. Dimock
BY
Robert M. Pierson
ATTORNEY
THE NORRIS PETERS CO., WASHINGTON, D. C.

UNITED STATES PATENT OFFICE.

JULIAN A. DIMOCK, OF DENNING, NEW YORK.

CAMERA-FOCUSING DEVICE.

No. 864,773.        Specification of Letters Patent.        Patented Sept. 3, 1907.

Application filed August 1, 1906. Serial No. 328,657.

*To all whom it may concern:*

Be it known that I, JULIAN A. DIMOCK, a citizen of the United States, residing at Denning, in the county of Ulster and State of New York, have invented certain new and useful Improvements in Camera-Focusing Devices, of which the following specification and accompanying drawing illustrate the invention in a form which I now regard as the best out of the various forms in which it may be embodied.

The object of this invention is to provide a device for focusing hand cameras in instantaneous photography and it consists in an improved form of focusing scale so constructed that the proper or approximate focus can be attained by means of the sense of touch, so that on the one hand the operator's vision is left practically unoccupied and free to follow the course of a moving object, and on the other hand the distance away of the object from the camera may be ascertained by the sense of touch while the operator's eyes are on the ground-glass.

Of the accompanying drawings, Figure 1 represents a side elevation of a reflecting camera provided with my improved focusing device; Fig. 2 represents a section on the line 2—2 of Fig. 1; Fig. 3 is an enlarged view showing the manner of using the invention.

The same reference characters represent the same parts in all the figures.

I have shown the device in connection with a reflecting camera, since it is this type of instrument which is best adapted to quickly photograph moving objects and which affords certain particular results in connection with my invention.

10 is the box of the camera; 11 is the lens mounted upon a sliding support 12, for the purpose of focusing, and 13 is the extensible focusing hood, through which the image may be observed on a ground-glass 23 in the top of the box, as reflected from a mirror 14 within the box. In this type of instrument there is often employed a "focal-plane" shutter, which I have indicated at 24, consisting of a slitted curtain moving in front of the dry-plate, under the impulse of a spring, which is wound up for each exposure and released by a thumb-piece or catch, such as 15 in Fig. 2, located on one side near the front of the box. 16 indicates the winding knob. The actuation of catch 15 first releases and throws the mirror 14 out of the path of the light rays, permitting the exposure to be properly made upon the dry-plate, and then releases the shutter 24. These arrangements are familiar in the art and are here shown only in a general way.

17 is the usual focusing knob attached to the outer end of a rod 18 carrying pinions 19 which mesh with the teeth of racks 20 attached to the lens-slide 12. I add to this knob a radial pin or projection 21, constituting an index adapted to travel over a segmental scale, which may be composed of headed pins 22 driven into the camera-box. Preferably, the positions of these pins correspond to the important focal distances. They are arranged with relation to the pin or pointer 21, so that the same finger or fingers of the operator's hand employed to adjust the pin 21 and thus turn the shaft 18 and focus the camera, can at the same time, by the sense of touch, feel the scale-points 22 and adjust the pin 21 in a desired relation to any one of these points. These points I term "prominences", using the term in a generic sense to indicate either a positive or negative projection, the only necessary consideration being that they shall be readily identifiable by the sense of touch, exercised in the manner set forth. A little experience with this scale enables the operator to instantly adjust the lens to an exact focal distance and all that he is required to do further, in order to obtain a correctly focused image without looking on the ground-glass, is to properly estimate or otherwise determine the distance of the object away from the camera at the moment of exposure. It will be noted that the focusing device is located on one side of the camera-box, near its lower forward corner, which enables the operator, with the hand on that side, to support the camera-box and at the same time focus the lens. The shutter-releasing knob 15 is located in a corresponding position upon the opposite side. These cameras when of considerable size are usually operated by holding the rear end of the box against the body or on the knees, while the hands support the front end and at the same time direct the camera toward the object, focus it and release the shutter.

While my invention may be so constructed that the pin 21, or an equivalent, touches the scale, it is indispensable to have the scale points so impressed or marked as to make them readily perceptible by the sense of touch and also that the projection 21, or its equivalent, shall be normally free to move over the scale by the mere exertion of pressure in the direction of its focusing movement.

It will be noted that my invention works in coöperation with the ground-glass for the securing of certain results peculiar to its use on reflecting cameras, that is, cameras which enable the image to be focused by the main lens on a ground-glass and an exposure made instantly thereafter without the intervention of one or more separate operations. Thus, since the scale-points 22 correspond to focal distances, it is possible to know the distance of the object from the camera at the instant of exposure, by knowing that the object was correctly focused on the ground-glass and observing the focal distance by the sense of touch without having to look at the scale. The distance of any comparatively-near object can thus be obtained with the operator's eyes on the ground-glass and his fingers on the focusing scale, and moreover the operator can place himself at a desired distance from the object by setting the scale and moving the camera into the corresponding focal distance as shown by the ground-glass. This eliminates the exercise of judgment in some situations where its elimination works a benefit.

The mechanical embodiment of my invention may be considerably varied within the scope of the claims in the way of the shape and location of the scale, the shape of the path of movement of the index, establishment of one or the other member as the movable part, and such matters. It is essential however that the scale shall have definite boundaries, that is, a beginning and an ending with reference to some fixed point or base so that the different scale points may have fixed and invariable values or correspondence with definite focal distances. Such a scale I term a "delimited" one, but the delimitation may be effected in various ways either in fixed or movable scales. In the illustration here given it is effected by making the scale-points stationary on the camera-body and causing the index 21 to have not more than one complete revolution.

What I claim as new and desire to secure by Letters Patent is:

1. In a focusing device, the combination, with the camera-box, of two members, one of which is connected with the focusing mechanism of the camera and normally free to move over the other by pressure exerted in the direction of its focusing movement, one of said members being an index and the other a delimited scale composed of prominences corresponding to the focal distances, said prominences being distinguishable by the sense of touch exerted by the fingers of the operator's hand performing a relative adjustment of the two members.

2. A camera-focusing device comprising, in combination with the camera, a stationary scale composed of raised points corresponding in position to the focal distances, and a revolving index connected with the camera-focusing mechanism and so located as to sweep over said scale at a substantial distance away from the scale-points, but in sufficiently close proximity thereto to enable the points to be felt by the fingers which move the index.

3. The combination with a reflecting camera having provision for focusing on a ground-glass by means of the main lens while the sensitive surface is in condition for exposure by the release of the shutter, of a focusing device including a delimited scale and an index, one of which is movable over the other and connected with the camera-focusing mechanism, said scale having prominences distinguishable by the sense of touch, whereby the focal distance of the object may be determined while the operator's eyes are on the ground-glass.

In testimony whereof I have hereunto set my hand in the presence of two subscribing witnesses, the 25th day of July 1906.

JULIAN A. DIMOCK.

Witnesses:
A. W. SIMCET,
G. A. WORLEY.